United States Patent [19]
Kang et al.

[11] Patent Number: 5,698,088
[45] Date of Patent: Dec. 16, 1997

[54] FORMIC ACID-GRAPHITE INTERCALATION COMPOUND

[75] Inventors: Feiyu Kang, Beijing, China; Yang Leng; Tong-Yi Zhang, both of Kowloon, Hong Kong

[73] Assignee: The Hong Kong University of Science and Technology, Hong Kong

[21] Appl. No.: 677,561

[22] Filed: Jul. 8, 1996

[51] Int. Cl.[6] .............................. C25B 1/00; C01B 31/04; C09C 1/56
[52] U.S. Cl. .............................. 205/555; 423/448; 423/460
[58] Field of Search .............................. 205/555; 423/448, 423/460

[56] References Cited

U.S. PATENT DOCUMENTS 3,404,061  10/1968  Shane et al. .............................. 161/125
5,503,717  4/1996  Kang et al. .............................. 205/478

FOREIGN PATENT DOCUMENTS 60-71507  4/1985  Japan .

Primary Examiner—Kathryn L. Gorgos
Assistant Examiner—Edna Wong
Attorney, Agent, or Firm—Burns, Doane, Swecker & Mathis

[57] ABSTRACT

A graphite intercalation compound is disclosed in which formic acid (HCOOH) is the intercalate. The GIC may be formed by an electrochemical process using formic acid solution as both the electrolyte and as the intercalate source. The resulting formic acid GIC may be expanded by rapid heating to produce an expanded graphite product that in turn may be mechanically processed into flexible graphite.

10 Claims, 1 Drawing Sheet

X-ray Diffraction Patterns of Formic Acid GICs with Stage 3 to 5.

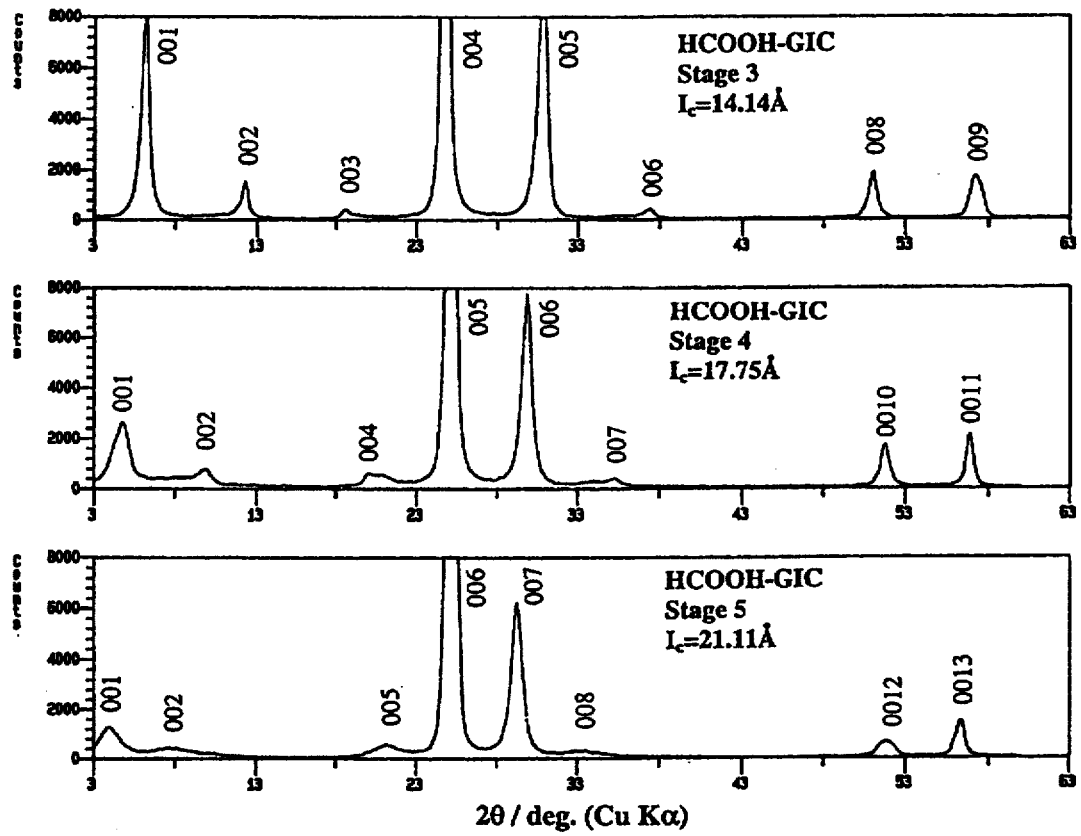
Figure 1. X-ray Diffraction Patterns of Formic Acid GICs with Stage 3 to 5.

FORMIC ACID-GRAPHITE INTERCALATION COMPOUND

FIELD OF THE INVENTION

This invention relates to a novel graphite intercalation compound and to a method of producing the compound. In particular the invention relates to a novel graphite intercalation compound suitable for use in the manufacture of flexible graphite.

BACKGROUND OF THE INVENTION

The crystal structure of natural flake graphite consists of layered planes of hexagonally arranged carbon atoms with strong covalent bonding within the layers and weak van der Waals bonding between layers. Due to such characteristics many species of molecules, atoms, ions and even atomic clusters can be inserted between the carbon planes. Such intercalation creates a new type of compound known as a graphite intercalation compound (GIC). The properties of GIGs differ not only from the host graphite but also from the properties of the guest intercalates.

When a GIC is rapidly heated to a high temperature, the intercalates between the graphite layers may be vaporised and the GIC decomposed causing exfoliation of the graphite. This exfoliation results in a very large (eg over 100 fold) expansion of the graphite in volume compared to the original flake material. This expansion produces worm-like or vermiform structures with highly active, dendritic, rough surfaces which can be either moulded or calendered into sheets.

The expansion process removes substantially all extraneous chemicals from the flakes. The moulding or calendering causes only mechanical interlocking of the expanded flakes so that the composition of the final sheet product is effectively pure graphite. Flexible graphite is a distinctive material with the essential properties of graphite plus some unique properties of its own. The standard properties of graphite include thermal stability, thermal conductivity, natural lubricity and chemical resistance to fluids. Flexible graphite combines these properties with the additional properties of flexibility, conformability and resilience. Such characteristics Of flexible graphite differ from other materials and make flexible graphite a superior high-performance sealing material.

For example, gaskets made by flexible graphite are superior to conventional elastomeric boned gaskets such as compressed asbestos. The flexible graphite is more thermally stable and chemically inert with considerably less creep relaxation. More importantly, flexible graphite is not harmful to health, while asbestos can cause cancer. Gaskets fabricated from flexible graphite are also preferable to other non-asbestos sheet gaskets, such as aramids, glass fibre and mica which have to be stuck together by an elastomer. The elastomer typically reduces gasket thermal stability and increases creep, thus resulting in poor performance under loading.

PRIOR ART

The traditional process for manufacturing flexible graphite is described as follows. Firstly, sulphuric acid is intercalated into natural graphite; then the $H_2SO_4$-GIC is expanded at a temperature range of 800°–1000° C.; finally the exfoliation product is compressed into a flexible sheet.

This process has at least two major disadvantages. The intercalation and expansion process can cause environmental pollution as it releases large amounts of $SO_2$ and $SO_3$. In addition $SO_2$ and $SO_3$ in the expanded graphite can corrode metals contacting the graphite seals. These disadvantages greatly limit the potential application of flexible graphite in, for example, nuclear power plants, aerospace, electronics and automotive parts. Modem industries require environmentally friendly and low-corrosive flexible graphite.

Other techniques for manufacturing GICs using different intercalates are also known. As examples one can cite Stummp, E., Ehrhardt, C and Klink, K., "Electrochemical Preparation of Zinc Chloride and Mercury Nitrate Graphite Intercalation Compounds", Ext. Abstr. Program Bienn. Conf. Carbon, 16th, pp254–5, 1983,: Stummp, E. and Werner, F., "Graphite Intercalation Compounds with Chlorides of Manganese, Nickel and Zinc", Carbon 4(4), 1966,: and Behrens, P., Beuthien, H., Eickhoff, H. P., Metz, W. and Niemann, W., "Structural Investigations of the Graphite Intercalation Compounds of the Dichlorides of the IIB-Elements (Zinc, Cadmium and Mercury)", Synth. Met. 23 (1–4), 95–100, 1988. In addition U.S. Pat. No. 5,503,717 discloses the preparation of flexible graphite from a $ZnCl_2$-GIC in which the GIC is prepared by an electrochemical reaction, however this preparation method is not ideal since the rapid heating of the GIC results in the release of in particular chlorine which can be deleterious.

SUMMARY OF THE INVENTION

According to the present invention there is provided a graphite intercalation compound wherein the intercalate comprises formic acid (HCOOH).

The present invention further provides a method of forming a HCOOH-graphite intercalation compound by an electrochemical process wherein HCOOH solution serves as both the electrolyte and the intercalate source, natural graphite serves as the anode, and the cathode is a metal.

Formation of the HCOOH-graphite intercalation compound can be achieved by controlling the applied current density and the reaction duration. A preferred current density is in the range of 20–200 A/m$^2$, more preferably from 50–150 A/m$^2$ and the reaction time is from 5 to 15 hours.

The anode preferably comprises natural graphite flakes. The particle size and carbon content of the flakes are not critical, however the smaller particle sizes provide for easier intercalation. Typically the particle sizes may be between about 0.15 and 0.5 mm, may by around 0.1 g in weight, and have a carbon content of between 90 to 99.9 wt %.

Preferably the cathode comprise a metal from the group consisting of platinum, stainless steel, copper, titanium, chromium, cobalt, nickel, aluminium, palladium, silver and gold.

The invention further extends to a method for forming a sheet of flexible graphite comprising the steps of:

(a) forming a HCOOH-graphite intercalation compound by an electrochemical process wherein HCOOH solution serves as both the electrolyte and the intercalate source, (b) expanding the HCOOH intercalated graphite produced in step (a) by rapid heating to a high temperature to produce an expanded graphite product, and (c) mechanically processing the expanded graphite produced in step (b) into a sheet of flexible graphite.

With this method the formation of the HCOOH-GIC can be controlled by controlling the applied current density in the range of 20–200 A/m$^2$, more preferably 50–150 A/m, and by varying the reaction time, which is preferably between 5 to 15 hours. With these parameters a HCOOH-GIC with a stage structure of from 3 to 5 may be obtained. Such a GIC may be easily exfoliated when it is rapidly heated and an advantage of a HCOOH-GIC in comparison with the prior art is that during the heating process only H, C and O are released into the atmosphere. Depending on the applied current density and the reaction time, an expansion volume of from 100–300 ml/g (400°–800° C.), volatile content 10–20 wt %, may be obtained. The residual sulphur content in the expanded graphite is no more than the sulphur impurity level of the primitive graphite flakes since the processing is totally sulphur free, in comparison more than 1000 ppm sulphur is typically found in conventional flexible graphite manufactured by $H_2SO_4$-GIC. In addition the flexible graphite does not contain additional corrosive species such as chlorine, fluorine, nitrogen and phosphor.

BRIEF DESCRIPTION OF THE DRAWINGS

Some examples of the invention will now be described by way of example and with reference to the accompanying figure in which the X-ray diffraction patterns of stage 3, stage 4 and stage 5 HCOOH-GIC's are shown.

DETAILED DESCRIPTION OF PREFERRED EMBODIMENTS

Around 0.1 g natural flake graphite (average particle size 0.3 mm, carbon content 99 wt %) is pressed into a disc of 1.15 cm in diameter and held by a platinum gauze to prevent it from fragmenting during processing. This disc is then used as the anode in an electrochemical process with two platinum plates serving as the cathode. The electrolyte comprises 100 ml formic acid (HCOOH) of a standard 97–98 wt % concentration.

An intercalation reaction is performed by means of an anodic oxidation to produce a formic acid—graphite intercalation compound (HCOOH-GIC), the degree of intercalation and the expansion volume of the HCOOH-GIC after heating depending on the applied current density and the reaction time as will be illustrated in the Examples below.

Preferred current densities range from 50–150 A/m$^2$ and preferred reaction times are from 5 to 15 hours. Following the reaction the graphite flakes are taken out and dried at 50°–60° C. and X-ray diffraction of the treated graphite indicates that the graphite has already been transformed to HCOOH-GIC with a stage structure of from 3 to 5 (FIG. 1).

The thus formed HCOOH-GIC may then be rapidly expanded. A graduated quartz glass beaker is heated to a chosen specific temperature (between 400° C. and 800° C.) in a muffle furnace and then 0.1 g of synthesised HCOOH-GIC is rapidly poured into the beaker. After about 10 seconds the beaker is removed from the furnace and the expansion volume is measured. Depending on the chosen reaction time and current density chosen, an expansion volume of between 150 ml/g and 300 ml/g may be obtained.

During the expansion process the intercalation elements (in this case H, C and O) are released. A measurement of the sulphur content indicates that the residual element content in the expanded graphite made by this method is low (less than 30 ppm for example), whereas in conventional flexible graphite made by use of a sulphuric acid GIC the residual sulphur content may be as high as 1000 ppm after expansion.

After expansion the exfoliated graphite may be formed into sheets of flexible graphite material by conventional processing such as calendering.

The effect of the reaction time on the synthesis of the HCOOH-GIC (as determined by its stage number) and the expansion volume may be determined by keeping the current density constant (at 50 A/m$^2$) and varying the reaction time—the synthesis of the HCOOH-GIC and its subsequent expansion being performed by the above described methods. The results are shown in Table 1 below:

TABLE 1

| Reaction Duration (hrs) | Stage No. | Expansion Vol. (ml/g) |
|---|---|---|
| 1 | no GIC | no expansion |
| 3 | High + G* | 10 |
| 4 | Stage 4 | 90 |
| 7 | Stage 3 | 110 |
| 14 | Stage 3 | 150 |
| 20 | Stage 3 | 170 |

*= GIC with high stage number plus graphite.

The effect of anodic current density during the synthesis reaction on both the GIC synthesis and also the resulting expansion volume of the expanded graphite material can be examined by fixing the reaction duration at ten hours and by varying the current density. The results are as shown in the following table 2:

TABLE 2

| Current Density (A/m$^2$) | Stage No. | Expansion Vol. (ml/g) |
|---|---|---|
| 10 | no GIC | no expansion |
| 25 | Stage 4 | 60 |
| 50 | Stage 3 | 150 |
| 100 | Stage 3 | 260 |
| 150 | Stage 3 | 240 |
| 200 | Stage 3 | 140 |

From these results it can be seen that while current densities of from 25 to 200 A/m$^2$ will produce significant expansion volumes, the best results (ie the greatest expansion volumes) are obtained with current densities of between 50 to 150 A/m$^2$.

We claim:

1. A HCOOH-graphite intercalation compound wherein formic acid (HCOOH) functions as the intercalate source.

2. A method of forming a HCOOH-graphite intercalation compound by an electrochemical reaction which uses an electrolyte, an intercalation source, an anode and a cathode material wherein the electrochemical reaction uses an HCOOH solution as both the electrolyte and the intercalate source, natural graphite as the anode material, and a metal as the cathode material.

3. The method as claimed in claim 2 wherein the electrochemical reaction is effected using a current density ranging from 20 to 200 A/m$^2$.

4. The method as claimed in claim 3 wherein the current density ranges from 50 to 150 A/m$^2$.

5. A method as claimed in claim 2 wherein the electrochemical reaction duration is in the range of from 5 to 15 hours.

6. A method as claimed in claim 2 wherein the anode comprises graphite flakes.

7. A method for forming a sheet of flexible graphite comprising the steps of:
  (a) forming a HCOOH-graphite intercalation compound by an electrochemical reaction involving an electrolyte, and intercalate source, wherein HCOOH solution serves as both the electrolyte and the intercalate source,
  (b) expanding the HOOCH intercalated graphite produced in step (a) by rapid heating to a high temperature to produce an expanded graphite product, and
  (c) mechanically processing the expanded graphite produced in step (b) into a sheet of flexible graphite.

8. A method as claimed in claim 7 wherein in the electrochemical reaction of step (a) is effected using a current density ranging from 20 to 200 A/m$^2$.

9. A method as claimed in claim 8 wherein the current density ranges from 50 to 150 A/m$^2$.

10. A method as claimed in claim 8 wherein the electrochemical reaction of step (a) is effected for a time ranging from 5 to 15 hours.

* * * * *